(12) United States Patent
Oh et al.

(10) Patent No.: US 10,349,457 B1
(45) Date of Patent: Jul. 9, 2019

(54) METHOD AND APPARATUS FOR SEAMLESSLY CONNECTING MULTIPLE ELECTRONIC DEVICES IN VEHICLE

(71) Applicants: HYUNDAI MOTOR COMPANY, Seoul (KR); KIA MOTORS CORPORATION, Seoul (KR)

(72) Inventors: Min Hyuk Oh, Seoul (KR); Hye Won You, Seoul (KR); Keun Hang Heo, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/033,644

(22) Filed: Jul. 12, 2018

(30) Foreign Application Priority Data

Feb. 27, 2018 (KR) .................. 10-2018-0023936

(51) Int. Cl.
| H04B 7/00 | (2006.01) |
| H04W 76/14 | (2018.01) |
| H04W 4/48 | (2018.01) |
| H04W 76/30 | (2018.01) |
| H04W 76/15 | (2018.01) |

(52) U.S. Cl.
CPC ............. *H04W 76/14* (2018.02); *H04W 4/48* (2018.02); *H04W 76/15* (2018.02); *H04W 76/30* (2018.02)

(58) Field of Classification Search
CPC ... H04B 7/0817; H04B 17/102; H04W 76/28; H04W 76/30; H04W 76/34; H04W 88/08

USPC .................. 455/569.1, 569.2, 41.2
See application file for complete search history.

(56) References Cited

U.S. PATENT DOCUMENTS

| 8,116,223 | B2 * | 2/2012 | Tian ...................... H04L 47/824 370/252 |
| 9,979,497 | B2 * | 5/2018 | Lin ........................ H04W 4/80 |
| 2009/0061769 | A1 | 3/2009 | Zimbric et al. |
| 2010/0195539 | A1 * | 8/2010 | Tian ...................... H04L 47/824 370/255 |
| 2015/0215954 | A1 * | 7/2015 | Pal ........................ H04W 88/08 370/329 |
| 2018/0167793 | A1 * | 6/2018 | Trip ........................ H04W 4/80 |

FOREIGN PATENT DOCUMENTS

| JP | 2016-0504777 A | 2/2016 |
| KR | 10-2015-0065004 A | 6/2015 |
| KR | 10-1568335 B1 | 11/2015 |
| KR | 10-2016-0011476 A | 2/2016 |
| KR | 10-1623477 B1 | 6/2016 |
| KR | 10-10623477 B1 | 6/2016 |

* cited by examiner

*Primary Examiner* — Sonny Trinh
(74) *Attorney, Agent, or Firm* — Morgan Lewis & Bockius LLP

(57) ABSTRACT

A method of connecting multiple electronic devices to an audio video navigation (AVN) teminal mounted in a vehicle includes receiving a connection request message from a third Bluetooth device in a state in which first and second Bluetooth devices have been connected to the AVN terminal, searching for a Bluetooth device, connection of which can be released, and releasing connection to any one of the first and second Bluetooth devices according to a search result and setting connection to the third Bluetooth device.

18 Claims, 7 Drawing Sheets

METHOD AND APPARATUS FOR SEAMLESSLY CONNECTING MULTIPLE ELECTRONIC DEVICES IN VEHICLE

This application is based on and claims the benefit of priority to Korean Patent Application No. 10-2018-0023936, filed on Feb. 27, 2018 with the Korean Intellectual Property Office, which is hereby incorporated by reference as if fully set forth herein.

TECHNICAL FIELD

The present disclosure relates to short-range wireless communication in a vehicle and, more particularly, to a method and apparatus for seamlessly connecting multiple electronic devices in a vehicle to seamlessly connect a plurality of Bluetooth devices through an audio video navigation (AVN) terminal in which a Bluetooth module is mounted.

BACKGROUND

Recently, an audio video navigation (AVN) terminal or a head unit has been mounted in a vehicle. The AVN terminal may provide not only a navigation function for providing a route to a destination to a user but also a display function of various control screens related to control of various devices installed in the vehicle or a display function of screens related to additional functions capable of being executed in the AVN terminal.

Therefore, studies on technology for controlling devices in the vehicle by the user by manipulating the AVN terminal through a display implemented as a touchscreen or through a jog shuttle type controller have been actively conducted.

Recently, rapid development of information technology (IT) has a significant effect on the automobile industry and various IT techniques are being incorporated into the vehicle.

In particular, vehicle pairing technology for providing a variety of services by connecting a user device such as a smartphone to a vehicle AVN terminal is in the spotlight.

For example, the vehicle may be equipped with a Bluetooth hands-free function. The Bluetooth hands-free function may be provided by a Bluetooth module included in the AVN terminal.

Generally, when the vehicle starts, a Bluetooth function of the AVN terminal is automatically activated so that the AVN terminal enters a pairing standby state. Then, the driver of the vehicle performs a Bluetooth pairing procedure by selecting a predetermined menu through the smartphone. If the pairing procedure is normally completed, the driver may make a phone call through the Bluetooth hands-free function.

A Bluetooth function is one of functions that users react most sensitively to among numerous functions provided by the vehicle and corresponds to an item that most frequently causes users to complain.

Accordingly, Bluetooth quality significantly affects a score of an initial quality study.

Currently, up to two Bluetooth devices are connectable to the AVN terminal due to properties of a Bluetooth software driver. Therefore, there is no method of seamlessly connecting three or more Bluetooth devices.

SUMMARY

Accordingly, the present disclosure is directed to a method and apparatus for seamlessly connecting multiple electronic devices in a vehicle that substantially obviate one or more problems due to limitations and disadvantages of the related art.

An objective of the present disclosure is to provide a method and apparatus for seamlessly connecting multiple electronic devices in a vehicle, wherein a plurality of Bluetooth devices can be seamlessly connected to the vehicle AVN terminal without additional user manipulation after initial Bluetooth device connection setting is performed once.

Another objective of the present disclosure is to provide a method and apparatus for seamlessly connecting multiple electronic devices in a vehicle, wherein three or more Bluetooth devices can be seamlessly connected.

Yet another objective of the present disclosure is to provide a vehicle AVN terminal capable of improving customer satisfaction by minimizing user inconvenience for vehicle Bluetooth pairing.

It will be appreciated by persons skilled in the art that the objectives that could be achieved with embodiments are not limited to what has been particularly described hereinabove and other objectives that are not mentioned herein will be more clearly understood from the following detailed description.

The present disclosure provides a method and apparatus for seamlessly connecting multiple electronic devices in a vehicle and a Bluetooth device linked to the apparatus.

To achieve these objectives and other advantages and in accordance with the purpose of the invention, as embodied and broadly described herein, a method of connecting multiple electronic devices to an audio video navigation (AVN) terminal mounted in a vehicle includes receiving a connection request message from a third Bluetooth device in a state in which first and second Bluetooth devices have been connected to the AVN terminal, searching for a Bluetooth device, connection of which can be released, and releasing connection to any one of the first and second Bluetooth devices according to a search result and setting connection to the third Bluetooth device.

The method may further include receiving streaming data from any one of the first and second Bluetooth devices.

The method may further include transmitting a streaming stop message to a Bluetooth device which is transmitting the streaming data.

The method may further include performing control to receive the streaming data from the third Bluetooth device after transmitting the streaming stop message.

The streaming data may include sound source data and, when the AVN terminal receives the sound source data from the third Bluetooth device, the method may further include performing control to output the sound source data through a speaker included in the vehicle.

If a sound source is played from the third Bluetooth device, a dispatch Bluetooth agent mounted in the third Bluetooth device may sense the sound source play and transmit the connection request message to the AVN terminal. A Bluetooth agent and a dispatch Bluetooth agent mounted in a microprocessor equipped in a Bluetooth device may be configured as software.

In another aspect of the present disclosure, a method of connecting multiple electronic devices in a vehicle to a Bluetooth device including a Bluetooth agent dispatched from an audio video navigation (AVN) terminal mounted in a vehicle includes sensing, by the Bluetooth agent, whether a sound source is played in the Bluetooth device, upon sensing that the sound source is played, confirming whether a device paired through Bluetooth to output sound is present, upon confirming that the device paired through Bluetooth is not present, confirming whether history information regarding pairing between the Bluetooth device and the AVN terminal is present, upon confirming that the history information regarding pairing between the Bluetooth device and the AVN terminal is present, transmitting a connection request message to the AVN terminal, and, upon receiving a connection acknowledgment message from the AVN terminal, streaming the played sound source and transmitting the streamed sound source to the AVN terminal.

The history information regarding pairing between the Bluetooth device and the AVN terminal may include media access control (MAC) address information of a Bluetooth module included in the AVN terminal.

Upon confirming that the device paired through Bluetooth to output sound is present, the method may further include outputting the played sound source using the paired device, and upon confirming that the history information regarding pairing between the Bluetooth device and the AVN terminal is not present, performing control to output the played sound source through a speaker included in the Bluetooth device.

In another aspect of the present disclosure, an apparatus for seamlessly connecting multiple electronic devices mounted in a vehicle includes a Bluetooth module configured to receive a connection request message from a third Bluetooth device in a state in which first and second Bluetooth devices have been connected, and a controller configured to search for a Bluetooth device, connection of which can be released, release connection to any one of the first and second Bluetooth devices according to a search result, and set connection to the third Bluetooth device.

If the connection request message is received in a state in which streaming data is being received through the Bluetooth module from any one of the first and second Bluetooth devices, the controller may generate a streaming stop message and transmit the streaming stop message to a Bluetooth device which is currently transmitting the streaming data.

The controller may perform control to receive the streaming data from the third Bluetooth device after transmitting the streaming stop message.

The streaming data may include sound source data and, when the sound source data is received from the third Bluetooth device, the controller may perform control to output the received sound source data through a speaker included in the vehicle.

If a sound source is played from the third Bluetooth device, a dispatch Bluetooth agent mounted in the third Bluetooth device may sense the sound source play and transmit the connection request message to the apparatus.

In another aspect of the present disclosure, a Bluetooth device linkable to an audio video navigation (AVN) terminal mounted in a vehicle includes a dispatch Bluetooth agent configured to sense a sound source play in the Bluetooth device, the dispatch Bluetooth agent being dispatched from the AVN terminal to the Bluetooth device, and generate a device connection confirmation request signal, and a user Bluetooth module configured to transmit a connection request message to the AVN terminal, when a device paired through Bluetooth to output sound is not present according to the device connection confirmation request signal and history information regarding pairing between the Bluetooth device and the AVN terminal is present, stream the played sound source when a connection acknowledgement message is received from the AVN terminal, and transmit the streamed sound source to the AVN terminal.

The history information regarding pairing between the Bluetooth device and the AVN terminal may include media access control (MAC) address information of a Bluetooth module included in the AVN terminal.

If the device paired through Bluetooth to output sound is present, the played sound source may be output using the device paired through Bluetooth, and when history information regarding pairing between the Bluetooth device and the AVN terminal is not present or the connection acknowledgement message is not received, the played sound source may be output through a speaker included in the Bluetooth device.

In another aspect of the present disclosure, a computer-readable recording medium in which a program for executing the method of connecting multiple electronic devices is recorded is provided.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION

Figure 1:
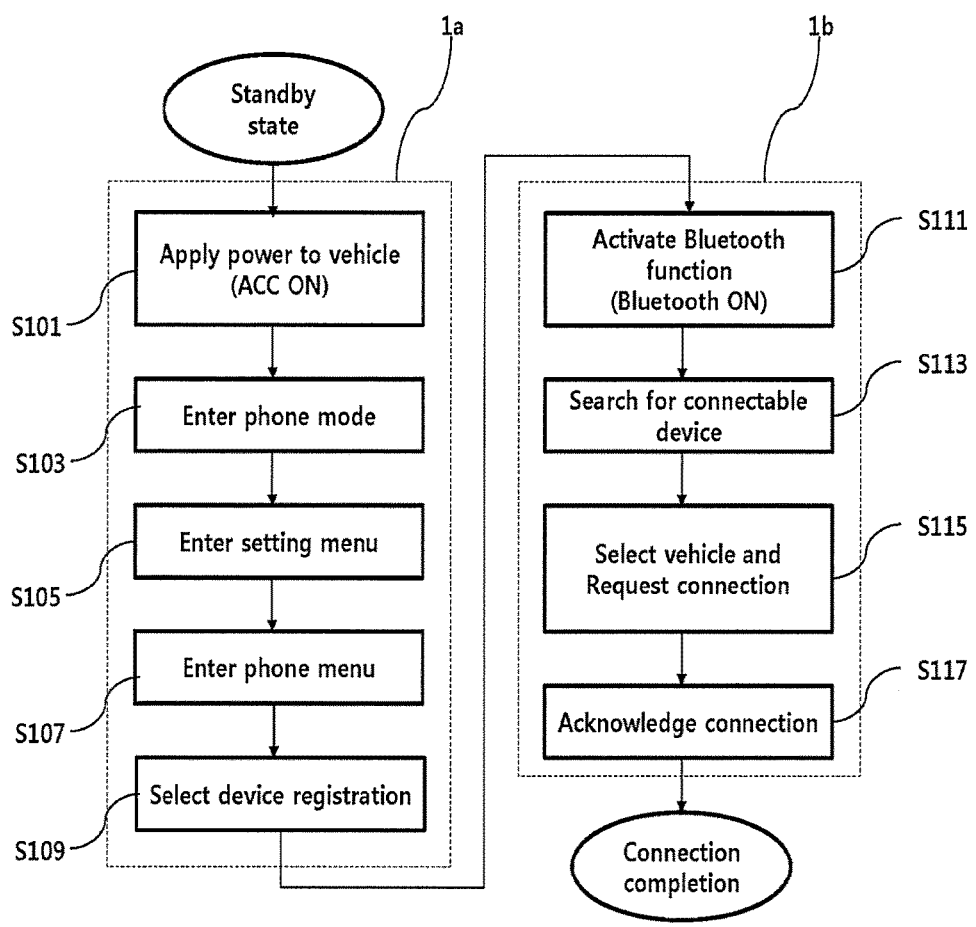
FIG. 1 is a diagram for explaining a conventional Bluetooth pairing procedure in a vehicle.

Reference will now be made in detail to the preferred embodiments of the present disclosure, examples of which are illustrated in the accompanying drawings. Wherever possible, the same reference numbers will be used throughout the drawings to refer to the same or like parts.

Hereinafter, apparatuses and methods to which embodiments of the present disclosure are applied will be described in detail with reference to the accompanying drawings. The suffixes "module" and "unit" of elements herein are used for convenience of description and thus can be used interchangeably and do not have any distinguishable meanings or functions.

Although all elements constituting the embodiments of the present disclosure are described as being combined into a single embodiment or as being combined into a single embodiment and then operated, the present disclosure is not necessarily limited thereto. That is, one or more of all the elements may be selectively combined and then operated within the objective and the scope of the present disclosure. Each of the elements may be implemented as independent hardware. Alternatively, some or all of the elements may be selectively combined into a computer program having a program module performing some or all functions combined in one or more pieces of hardware. Code and code segments constituting the computer program may be easily reasoned by those skilled in the art to which the present disclosure pertains. The computer program may be stored in computer readable media such that the computer program is read and executed by a computer to implement embodiments of the present disclosure. Computer program storage media may include magnetic recording media, optical recording media, and carrier wave media.

The terms "comprises", "includes", and "has" described herein should be interpreted not to exclude other elements but to further include such other elements since the corresponding elements may be inherent unless mentioned otherwise. All terms including technical or scientific terms have the same meaning as generally understood by a person having ordinary skill in the art to which the present disclosure pertains unless mentioned otherwise. Generally used terms, such as terms defined in a dictionary, should be interpreted to coincide with meanings in the related art from the context. Unless obviously defined in the present disclosure, such terms should not be interpreted as having ideal or excessively formal meanings.

Additionally, in describing the components of the present disclosure, terms like first, second, A, B, (a), and (b) are used. These are used solely for the purpose of differentiating one component from another, and one of ordinary skill would understand that the terms do not imply or suggest the substances, order or sequence of the components. If a component is described as "connected", "coupled", or "linked" to another component, one of ordinary skill in the art would understand that the components are not necessarily directly "connected", "coupled", or "linked" but may also be indirectly "connected", "coupled", or "linked" via a third component.

FIG. 1 is a diagram for explaining a conventional Bluetooth pairing procedure in a vehicle.

The conventional Bluetooth pairing procedure includes a Bluetooth pairing procedure 1a performed in a vehicle head unit and a Bluetooth pairing procedure 1b performed in an electronic device having a Bluetooth function, i.e., a user device.

Referring to the Bluetooth pairing procedure 1a performed in the vehicle head unit, if a vehicle system is ready to operate by starting the vehicle by a user and applying a power source to the vehicle (i.e., ACC is ON), an AVN terminal or a vehicle head unit (H/U) may start to perform an automatic Bluetooth pairing procedure. In this case, the vehicle H/U may enter a phone mode and attempt to pair with a predesignated or preregistered user device, for example, a driver smartphone (steps S101 and S103). In addition, a predetermined user interface screen showing that connection to a specific device is being attempted may be configured and displayed on a display screen of the vehicle H/U.

If the user cancels the pairing procedure which is automatically performed after the vehicle is turned on, the vehicle H/U may sequentially enter a setting menu and a phone menu and configure and display a predetermined user interface screen (hereinafter referred to as a "device registration selection screen" for convenience of description) including a menu for registering a new user device or selecting one of already registered user devices (steps S105 to S109). In this case, the user may designate a pairing target user device on the device registration selection screen according to menu selection. In addition, a predetermined guidance message indicating that a Bluetooth function of the pairing target user device should be activated may be displayed on the display screen of the vehicle H/U.

Referring to the Bluetooth pairing procedure 1b performed in the user device, the user may activate the Bluetooth function according to the guidance message displayed on the screen of the vehicle H/U (step S111).

If the user activates the Bluetooth function of the user device, the user device may search for a peripheral device with which the user device can be paired through Bluetooth and display a search result on a user screen (step S113).

If a vehicle of the user is selected by the user on the screen on which the search result is displayed, the user device transmits a connection request signal to the selected vehicle (step S115). In this case, a predetermined password key input screen for inputting a password key value corresponding to the selected vehicle may be displayed on the user device screen.

Upon receiving the connection request signal from the user device, the vehicle H/U may display vehicle information and the password key value on the screen.

The user device receives the password key value on the password key input screen and transmits the password key value to the vehicle H/U. If the received password key value is equal to a prestored password key value of the vehicle H/U, the vehicle H/U may transmit an acknowledgement completion message indicating that acknowledgement of the connection request has been completed to the user device (step S117).

Figure 2:
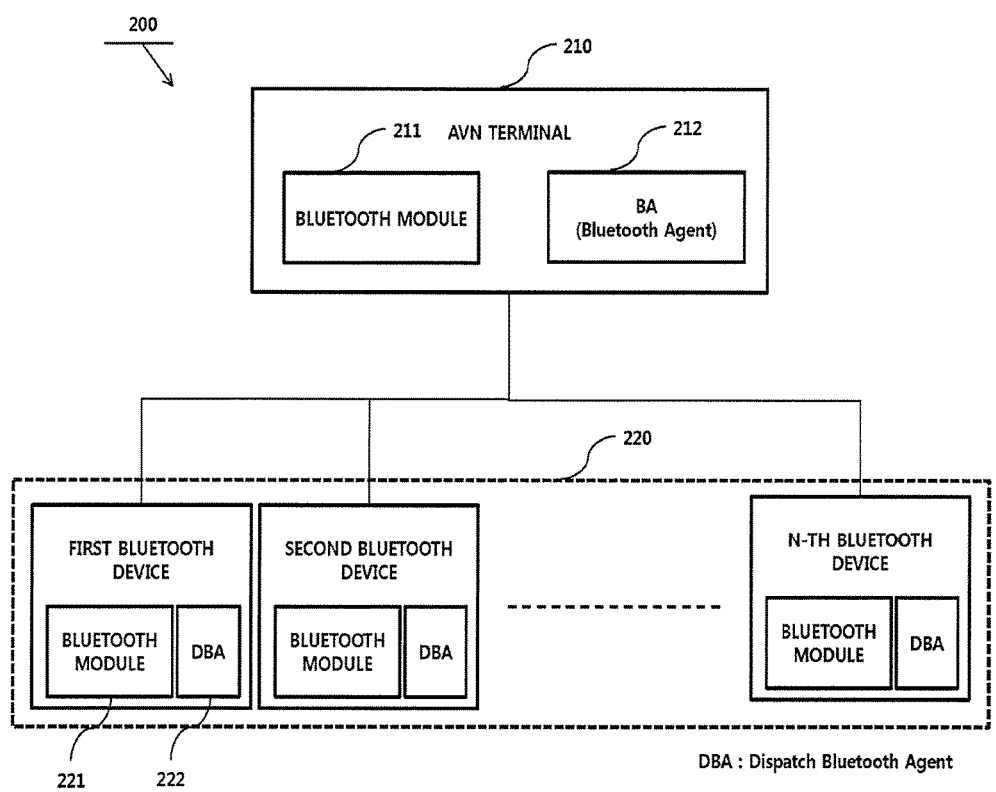
FIG. 2 is a diagram for explaining construction of a vehicle Bluetooth system according to an embodiment of the present disclosure.

FIG. 2 is a diagram for explaining construction of a vehicle Bluetooth system according to an embodiment of the present disclosure.

Referring to FIG. 2, a vehicle Bluetooth system 200 may broadly include an AVN terminal 210 and first to N-th Bluetooth devices 220. Herein N may be 3 or more.

Each of the first to N-th Bluetooth devices 220 according to the present embodiment may be mounted in a user electronic device such as a smartphone or a laptop.

According to an embodiment, the AVN terminal 210 may include a Bluetooth module 211 and a Bluetooth agent (BA) 212.

The AVN terminal 210 is mounted in a vehicle and may be a device equipped with navigation, Bluetooth, and air conditioner control functions as well as a multimedia playback function such as audio or video playback.

Each of the Bluetooth devices 220 may include a Bluetooth module 221 and a dispatch Bluetooth agent (DBA) 222.

The DBA 222 may be operated only when connection between a corresponding Bluetooth device and the AVN terminal 210 is released and history information regarding pairing between the corresponding Bluetooth device and the AVN terminal 210 is present. Accordingly, if the history information regarding pairing between the corresponding Bluetooth device and the AVN terminal 210 is deleted, the DBA 222 allocated to the corresponding Bluetooth device may be eliminated by itself. The history information about pairing may be a Bluetooth media access control (MAC) address of the AVN terminal 210.

Hereinafter, for convenience of description and avoidance of confusion, the Bluetooth module 211 mounted in the AVN terminal 210 will be referred to as a vehicle Bluetooth module and the Bluetooth modules 221 mounted in each of the first to N-th Bluetooth devices 220 will be referred to as a user Bluetooth module.

Each of the vehicle Bluetooth module 211 and the user Bluetooth module 221 may include a hardware module (not illustrated) for physical communication connection to a counterpart Bluetooth module and a software stack (not illustrated) for controlling an inner operation of the Bluetooth module by software and processing a message transmitted and received through the hardware module.

The BA 212 mounted in the AVN terminal 210 and/or the DBA 222 of the Bluetooth device 220 may be also a hardware module, e.g., a processor, which is an electric circuitry that executes instructions of software which thereby performs various functions described hereinafter.

The functions performed by the BA 212 may include, e.g., a pairing process for managing the first to N-th Bluetooth devices 220 and, if initial communication connection is established between the AVN terminal 210 and a Bluetooth device, the BA 212 may be dispatched to a corresponding Bluetooth device. That is, if communication connection is established for the first time between the AVN terminal 210 and the Bluetooth device, the DBA 222 may be generated in a corresponding Bluetooth device.

The DBA 222 may monitor a Bluetooth connection state of a Bluetooth device mounted therein when a specific event occurs.

For example, upon sensing a music playback event, the DBA 222 may monitor a Bluetooth connection state of a Bluetooth device mounted therein. That is, when the music playback event is sensed, the DBA 222 may confirm whether information about a device paired through Bluetooth is present for the purpose of output of sound.

If the information is present as a confirmation result, the DBA 222 may perform a control operation such that a sound source played through a device which has already been paired through Bluetooth, for example, a Bluetooth speaker or Bluetooth headphones, may be output.

Meanwhile, if the information about the device which has already been paired through Bluetooth is not present as the confirmation result, the DBA 222 may attempt to perform direct connection to the AVN terminal 210 using a prestored MAC address of the AVN terminal 210. In this case, if a corresponding connection request is acknowledged by the AVN terminal 210, the DBA 222 may stream the played sound source to the AVN terminal 210 through Bluetooth communication and the AVN terminal 210 may output the received sound source through a speaker mounted in the vehicle.

If there is no response to the connection request from the AVN terminal 210, the DBA 222 may perform a control operation such that the played sound source may be output through a currently paired Bluetooth device.

As another example, upon sensing a call event, the DBA 222 may monitor a Bluetooth connection state of a Bluetooth device mounted therein.

As described above, the DBA 222 may perform a control operation such that the Bluetooth module 221 transmits a connection request signal to the AVN terminal 210 based on a Bluetooth connected state.

Figure 3:
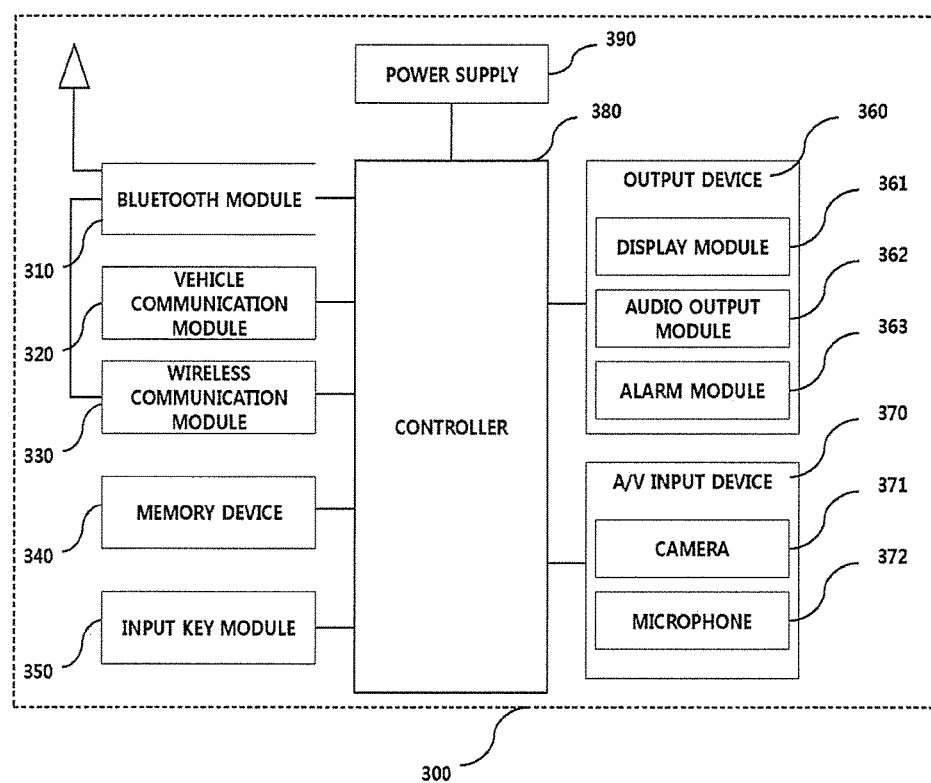
FIG. 3 is a block diagram for explaining an internal construction of an AVN terminal according to an embodiment of the present disclosure.

FIG. 3 is a block diagram for explaining an internal construction of an AVN terminal according to an embodiment of the present disclosure.

As illustrated in FIG. 3, an AVN terminal 300 according to the present disclosure may include a Bluetooth module 310, a vehicle communication module 320, a wireless communication module 330, a memory 340, an input key module 350, an output device 360, an audio/video (A/V) input device 370, a controller 380, and a power supply 390.

The Bluetooth module 310 may include a baseband module for processing a baseband signal according to the Bluetooth specification, a power amplifier for amplifying the baseband signal, a baseband pass filter (BPF) for converting the amplified baseband signal into a signal of a transmission frequency band or passing only a signal of a desired frequency band among radio frequency (RF) signals received through an antenna, a low noise amplifier (LNA) for amplifying the band-pass filtered RF signal to easily recognize the RF signal and transmitting the amplified signal to the baseband module, and the antenna for transmitting and receiving the RF signals.

The Bluetooth module 310 may perform Bluetooth communication through a predetermined control procedure with a user device, a Bluetooth function of which is activated. For example, the Bluetooth module 310 may transmit a predetermined Bluetooth connection request signal to the user device and receive an acknowledgement signal of the Bluetooth connection request from the user device. If acknowledgment is ended, the Bluetooth module 310 may receive phonebook information stored in the user device and store the phonebook information in the memory 340.

The vehicle communication module 320 is in charge of communication with electric control units (ECUs) mounted in the vehicle. For example, when the vehicle is turned on, the vehicle communication module 320 may receive a control signal indicating that ACC is ON from an ECU which senses starting of the vehicle and transmit the control signal to the controller 390. The controller 380 may apply power to a vehicle H/U and start an automatic Bluetooth pairing procedure.

The wireless communication module 330 may perform at least one wireless communication function among telematics communication, mobile communication, radio signal reception, and broadcast signal reception.

The memory 340 may store programs for operations of the controller 380 and lower modules controlled by the controller 380 and temporarily store input/output data, for example, phonebook information, messages, sound sources, still images, videos, and application programs. Herein, the application programs may include programs for Bluetooth communication, navigation, gaming, chatting, web surfing, schedule management, or multimedia playback.

In particular, the memory 340 may store a program for achieving a method of seamlessly connecting multiple electronic devices.

In addition, data about vibration and sound of various patterns output during touch input on a touchscreen may be stored in the memory 340.

The memory 340 may include at least one type of storage medium among a flash memory type, a hard disk type, a multimedia card micro type such as an SD or XD memory, a random access memory (RAM), a static RAM (SRAM), a read-only memory (ROM), an electrically erasable programmable read-only memory (EEPROM), a programmable read-only memory (PROM), a magnetic memory, a magnetic disk, and an optical disk.

The input key module 350 generates input data for controlling operation of the AVN terminal 300. The input key module 350 may be configured by a key pad, a dome switch, a (capacitive/resistive type) touch pad, a jog wheel, a jog switch, etc.

The output device 360 may include a display module 361, an audio output module 362, and an alarm module 363 which generate an output related to sight, hearing, and touch sense.

The display module 361 outputs information processed by the AVN terminal 300. For example, when the AVN terminal 300 is in a Bluetooth hands-free talk mode, the display module 361 displays a user interface (UI) or a graphical user interface (GUI) related to the corresponding mode. If the AVN terminal 300 is in a navigation mode, the display module 361 displays a UI or a GUI related to navigation.

The display module 361 may include at least one of a liquid crystal display, a thin film transistor-liquid crystal display, an organic light-emitting diode display, a flexible display, and a three-dimensional (3D) display.

According to an implementation type of the AVN terminal 300, two or more display modules 361 may be present. For example, a plurality of display modules 361 may be separately disposed on one surface of the AVN terminal 300 or may be integrated and disposed on one surface of the AVN terminal 300. Alternatively, a plurality of display modules 361 may be respectively disposed on different surfaces of the AVN terminal 300.

If the display module 361 and a sensor for sensing a touch operation (hereinafter referred to as a "touch sensor") form a multilayer structure (hereinafter referred to as a "touch-screen"), the display module 361 may be used as an input device in addition to an output device.

The touch sensor may be a type, for example, a touch film, a touch sheet, or a touch pad.

The touch sensor may be configured to convert a variation of pressure applied to a specific part of the display module 361 or capacitance occurring on a specific part of the display module 361 into an electrical input signal. The touch sensor may also be configured to detect pressure during touch as well as a touched location or a touched area.

If touch input for the touch sensor is present, signal(s) corresponding to touch input are transmitted to a touch controller. The touch controller processes the signal(s) and transmits data corresponding to the processed signal(s) to the controller 380. Thus, the controller 380 may recognize which area of the display module 361 a user touches.

The audio output module 362 may output audio data which is received from an external user device through the Bluetooth module 310 or stored in the memory 340 in a Bluetooth hands-free talk mode, an audio source/video play mode, or a navigation mode. The audio output module 362 may output a sound effect signal related to a function performed by the AVN terminal 300 (e.g., incoming call signal sound, incoming message sound, pairing completion sound, etc.). The audio output module 362 may include a receiver, a speaker, a buzzer, etc. The sound output module 362 may also output sound through a headphone jack installed at one side of the AVN terminal 300.

The alarm module 363 outputs a signal for indicating occurrence of an event of the AVN terminal 300. An example of the event generated by the AVN terminal 300 may include call signal reception, message reception, key signal input, touch input, and vehicle state information reception from the vehicle communication module 320. Herein, the vehicle state information may include door open information, engine overheat information, lane deviation information, and fuel state information.

The alarm module 363 may output a signal other than a video signal or an audio signal, for example, a signal for indicating occurrence of an event through vibration. The video signal or the audio signal may also be output through the display module 361 or the sound output module 362.

The A/V input device 370 is used to input the audio signal or the video signal and may include a camera 371 and a microphone 372.

The camera 371 processes an image frame such as a still image or a moving image obtained by an image sensor in a video call mode or a capture mode. The processed image frame may be displayed on the display module 361. The camera 371 may capture a rear view image when a driver reverses the vehicle and the captured image may be output through the display module 361.

The image frame processed by the camera 371 may be stored in the memory 340 or may be transmitted to a user device paired through the Bluetooth module 310.

Two or more cameras 371 may be provided according to constructions of the AVN terminal 300 and the vehicle.

The microphone 372 may receive an external audio signal through the microphone in a call mode, a recording mode, or a voice recognition mode and convert the audio signal into electronic voice data. Herein, in the call mode, the converted voice data may be transmitted to the user device paired through the Bluetooth module 310.

The microphone 372 may transmit the converted voice data in the voice recognition mode to the controller 380. The controller 380 may perform voice recognition of the received voice data with reference to a voice recognition database stored in the memory 340.

The power supply 390 supplies power necessary for operation of the AVN terminal 300. If the vehicle is turned on, the power supply 390 may automatically supply power to the AVN terminal 300. If the vehicle is turned off, it is apparent that the power supply 390 may cut off the power which is automatically applied to the AVN terminal 300.

The controller 380 typically controls an overall operation of the AVN terminal 300.

For example, the controller 380 may control installation and driving of an application program as well as a hands-free call, data communication, and a video call using Bluetooth pairing.

The controller 380 may perform pattern recognition processing capable of recognizing handwriting input and picture drawing input performed on the touchscreen as characters and images, respectively.

The controller 380 according to the present disclosure may dynamically control Bluetooth connection according to a connection request received in a Bluetooth paired state.

The controller 380 may control connection setting/release for three or more different Bluetooth devices without any user manipulation.

Currently, the Bluetooth standard physically allows Bluetooth connection of a maximum of two devices. However, the AVN terminal 300 according to the present disclosure may dynamically determine a Bluetooth device, connection of which can be released, when a request for Bluetooth connection of three or more devices is made, and perform a connection release and setting procedure in a transparent manner to the user.

Thus, even in the AVN terminal 300 which can physically perform Bluetooth connection with only up to two devices in actuality, the user may use the AVN terminal 300 as if three or more Bluetooth devices are connected through the AVN terminal 300.

Figure 4:
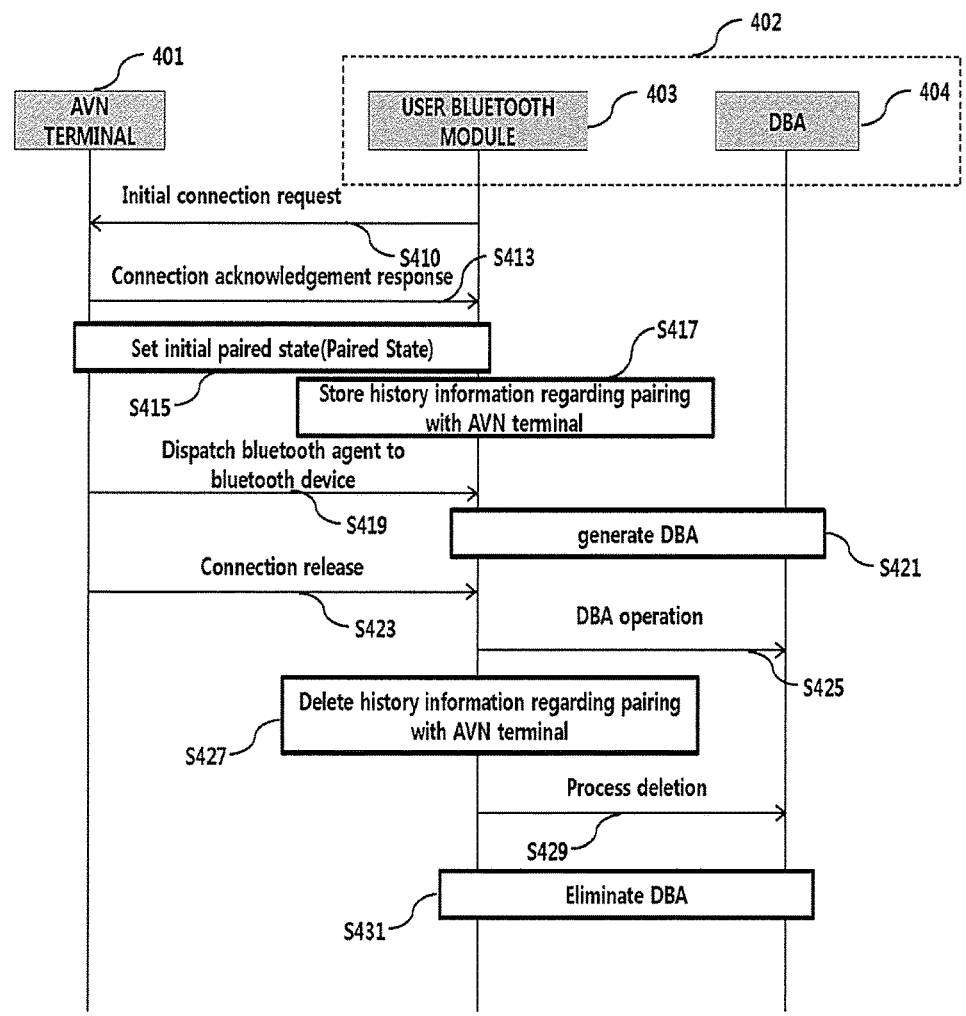
FIG. 4 is a flowchart for explaining a connection setting and release procedure between an AVN terminal and a Bluetooth device according to an embodiment of the present disclosure.

FIG. 4 is a flowchart for explaining a connection setting and release procedure between an AVN terminal and a Bluetooth device according to an embodiment of the present disclosure.

Referring to FIG. 4, a user Bluetooth module 403 of a Bluetooth device 402 may request initial pairing by transmitting an initial connection request message to an AVN terminal 401 (step S410).

Upon succeeding in acknowledging the Bluetooth device 402, the AVN terminal 401 may transmit a connection acknowledgement response message to the user Bluetooth module 403 (step S413).

Next, initial connection may be established between the AVN terminal 401 and the Bluetooth device 402 (step S415).

Upon successfully performing initial connection, the user Bluetooth module 403 may store history information regarding pairing between the Bluetooth device 402 and the AVN terminal 401 in an internal memory (step S417). Herein, the history information regarding pairing may include Bluetooth MAC address information of the AVN terminal 401.

Upon successfully performing initial connection, the AVN terminal 401 may transmit a Bluetooth agent dispatch message to the user Bluetooth module 403 (step S419).

Upon receiving the Bluetooth agent dispatch message, the user Bluetooth module 403 may generate a DBA 404 with respect to the Bluetooth device 403 (step S421).

After generating the DBA 404, the user Bluetooth module 403 may receive a connection release message from the AVN terminal 401 (step S423).

Upon receiving the connection release message, the user Bluetooth module 403 may transmit a DBA operation message for activating operation of the DBA 404 to the DBA 404 (step S425).

Thereafter, the user Bluetooth module 403 may delete the prestored history information about pairing between the Bluetooth device 402 and the AVN terminal 401 (step S427). For example, the user Bluetooth module 403 may delete the prestored history information regarding pairing between the Bluetooth device 402 and the AVN terminal 401 according to predetermined user input or menu selection on the Bluetooth device 402 but embodiments are not limited thereto.

After deleting the history information about pairing between the Bluetooth device 402 and the AVN terminal 401, the user Bluetooth module 403 may transmit a process deletion message to the DBA 404 (step S429). Subsequently, the DBA 404 may be eliminated from the Bluetooth device 402 according to reception of the process deletion message (step S431).

The DBA 404 may be activated and operated only when connection between the Bluetooth device 402 and the AVN terminal 401 is released and the history information regarding pairing between the Bluetooth device 402 and the AVN terminal 401 is present. Accordingly, if the history information regarding pairing between the Bluetooth device 402 and the AVN terminal 401 is deleted, the DBA 404 allocated to the Bluetooth device 404 is eliminated by itself.

Figure 5:
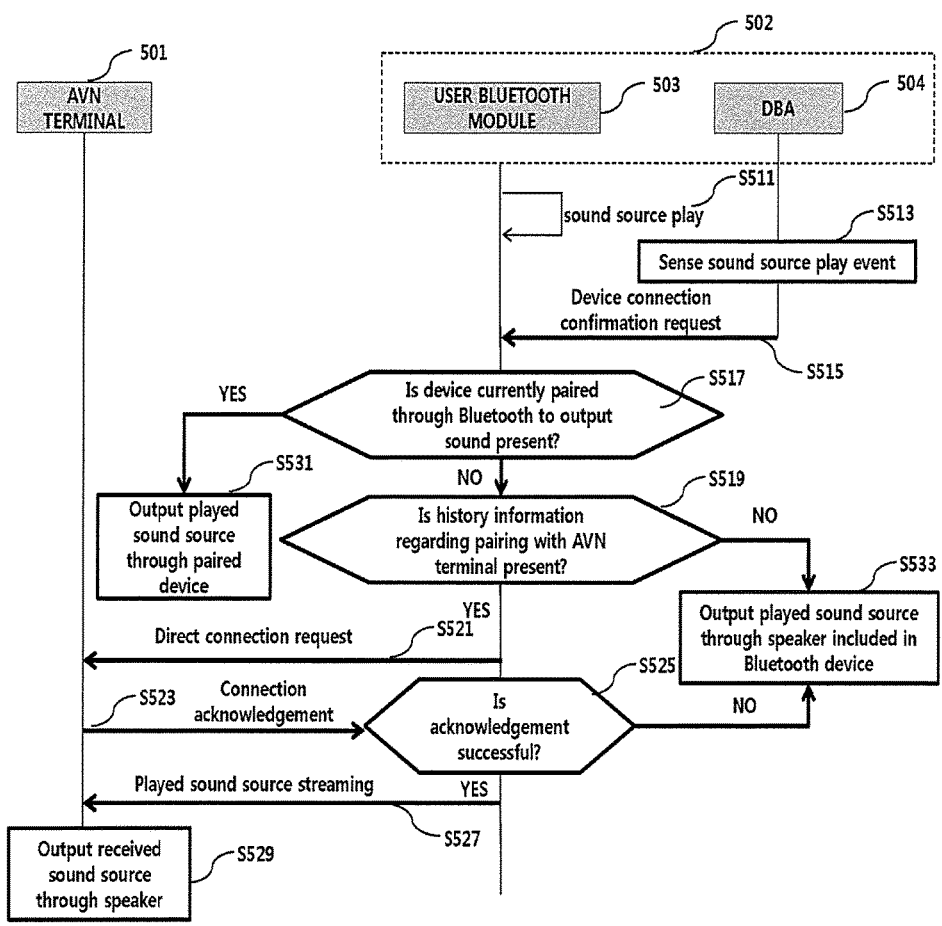
FIG. 5 is a flowchart for explaining operation of a DBA mounted in a Bluetooth device according to an embodiment of the present disclosure.

FIG. 5 is a flowchart for explaining operation of a DBA mounted in a Bluetooth device according to an embodiment of the present disclosure.

Referring to FIG. 5, if a Bluetooth device 502 reproduces a sound source according to user input (step S511), an activated DBA 504 may sense a sound source play event (step S513). Upon sensing the sound source play event, the DBA 504 may transmit, to a user Bluetooth module 503, a device connection confirmation request message for confirming whether information about a device paired through Bluetooth to output a sound source currently played in the Bluetooth device 502 is present (step S515).

Upon receiving the device connection confirmation request message, the user Bluetooth module 503 may confirm whether a device which is currently paired through Bluetooth to output sound is present (step S517).

As a confirmation result in step S517, if the device which is currently paired through Bluetooth is not present, the user Bluetooth module 503 may confirm whether history information regarding pairing between the Bluetooth device 502 and an AVN terminal 501 is present (step S519).

As a confirmation result in step S519, if the history information regarding pairing between the Bluetooth device 502 and the AVN terminal 501 is present, the user Bluetooth module 503 may transmit a direct connection request message to the AVN terminal 501 using Bluetooth MAC address information (step S521).

If a connection acknowledgement message is normally received within a predetermined time and acknowledgement is successful (steps S523 and S525), the user Bluetooth module 503 may stream a sound source which is being played in the Bluetooth device 502 and transmit the streamed sound source to the AVN terminal 501 (step S527).

The AVN terminal 501 may output the received sound source through a speaker included in the vehicle (step S529).

As the confirmation result in step S517, if a device which is currently paired through Bluetooth is present, the Bluetooth device 502 may perform a control operation such that the played sound source may be output through the paired device, for example, a Bluetooth speaker or Bluetooth headphones.

As the confirmation result in step S519, if the history information regarding pairing between the Bluetooth device 502 and the AVN terminal 501 is not present, the user Bluetooth module 503 may perform a control operation such that the played sound source may be output through a sound source output means, for example, a speaker, included in the Bluetooth device 502 (step S533).

If acknowledgement fails in step S525, for example, if a response message corresponding to the direct connection request message is not received within a predefined time, the user Bluetooth module 503 may perform a control operation such that the played sound source may be output through the sound source output means, for example, the speaker, included in the Bluetooth device 502.

Figure 6:
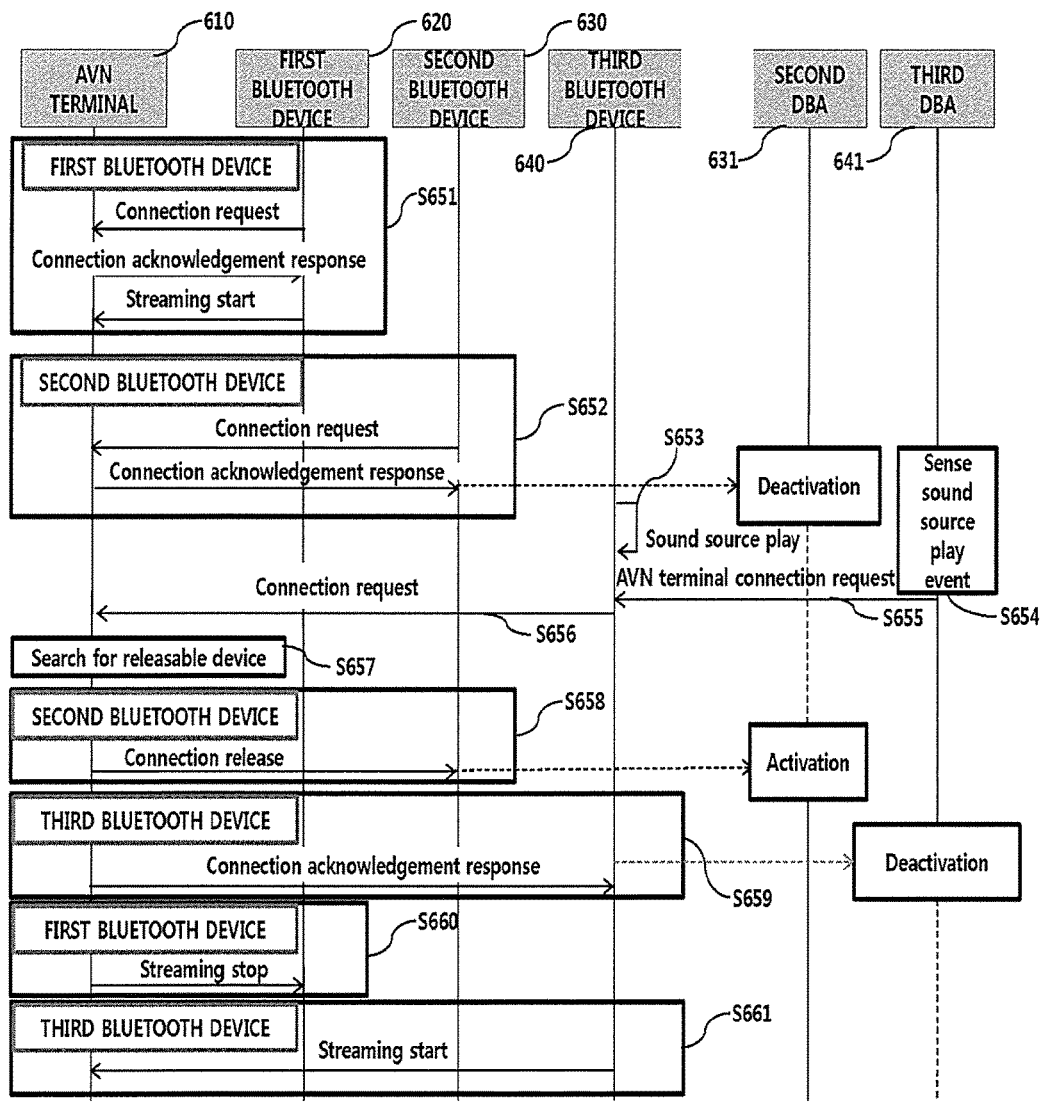
FIG. 6 is a flowchart for explaining a method of seamlessly connecting multiple electronic devices in a vehicle according to an embodiment of the present disclosure.

FIG. 6 is a flowchart for explaining a method of seamlessly connecting multiple electronic devices in a vehicle according to an embodiment of the present disclosure.

In this embodiment, it is assumed that three Bluetooth devices which are connectable to an AVN terminal 610 in a vehicle are present. The Bluetooth devices may include respective Bluetooth modules and a DBA may be activated as needed.

Particularly, in this embodiment, it should be noted that first to third Bluetooth devices 620, 630, and 640 have history information regarding pairing with the AVN terminal 610.

As described in the afore-described drawings, the DBA may be activated and operated in a state in which pairing setting between a corresponding Bluetooth device and an AVN terminal is released.

In addition, it should be noted that the AVN terminal 610 according to the present embodiment can physically set connection to up to two Bluetooth devices.

In the following embodiments, a second DBA 631 and a third DBA 641 are DBAs which are activated and operated by the second Bluetooth device 630 and the third Bluetooth device 630, respectively.

The AVN terminal 610 may acknowledge connection according to a connection request from the first Bluetooth device 620 and receive streaming data from the first Bluetooth device 620 (step S651). In this case, the AVN terminal 610 may output the received streaming data through an output means. For example, the output means may be a speaker when the streaming data is a sound source and may be a display screen when the streaming data is an image or a video. However, embodiments are not limited thereto.

The AVN terminal 610 may acknowledge connection according to a connection request from the second Bluetooth device 630 (step S652). Herein, a maximum of two devices may be physically connected through Bluetooth to the AVN terminal 610 and the second DBA 631 may be deactivated according to connection acknowledgement.

When a sound source is played in the third Bluetooth device 640 (step S653), the third DBA 641 of the third Bluetooth device 640 may sense a sound source play event and transmit an AVN terminal connection request message to the third Bluetooth device 640 (step S655).

Upon receiving the AVN terminal connection request message, the third Bluetooth device 640 may transmit a connection request message to the AVN terminal 610 (step S656).

Upon additionally receiving the connection request message from the third Bluetooth device 640 in a state in which two Bluetooth devices have been physically connected, the AVN terminal 610 may search for a Bluetooth device, connection of which can be released, in a transparent manner to the user (step S657).

As a search result, if the second Bluetooth device 630 is determined to be a releasable Bluetooth device, the AVN terminal 610 may transmit a connection release message to the second Bluetooth device 630 (S658). If the connection release message is received by the second Bluetooth device 630, the second DBA 631 may be activated and operated.

Next, upon successfully acknowledging the third Bluetooth device 640, the AVN terminal 610 may transmit a connection acknowledgement response message to the third Bluetooth device 640 and set connection with the third Bluetooth device 640 (step S659). If the connection acknowledgement response message is received by the third Bluetooth device 640, the third DBA 641 may be deactivated.

The AVN terminal 610 may transmit a streaming stop message for commanding stop of streaming to the first Bluetooth device 620 which is being currently paired with the AVN terminal 610 and is transmitting streaming data to the AVN terminal 610 (S660). Upon receiving the streaming stop message, the first Bluetooth device 620 may stop transmitting the streaming data. Herein, it should be noted that a connected state of the first Bluetooth device 620 is maintained.

If the first Bluetooth device 620 stops transmitting the streaming data, the AVN terminal 610 may perform a control operation such that the third Bluetooth device 640 may transmit the streaming data (step S661).

As illustrated in the embodiment of FIG. 6, a Bluetooth device having history information regarding pairing with the AVN terminal 610 may be paired with the AVN terminal 610 regardless of the number of Bluetooth devices which currently connected to the AVN terminal 610. Particularly, upon receiving the connection request message from a Bluetooth device which is reproducing a sound source, the AVN terminal 610 according to the present automatically performs a connection and release procedure in a transparent manner to the user, thereby minimizing user inconvenience.

According to the present disclosure, the user may simply reproduce a sound source in a Bluetooth device which maintains the history information regarding pairing with the AVN terminal so that the user may appreciate music which is automatically played through a vehicle speaker.

Figure 7:
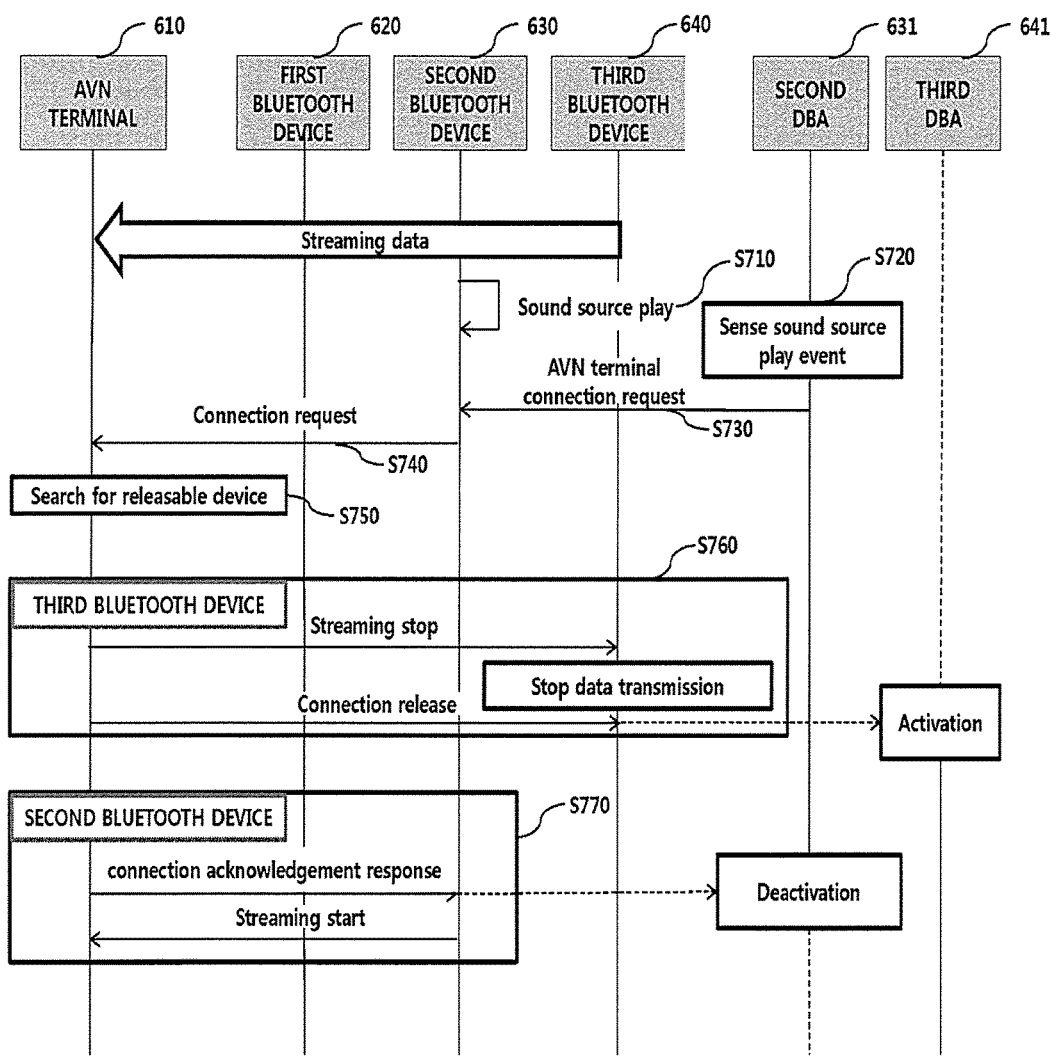
FIG. 7 is a flowchart for explaining a method of seamlessly connecting multiple electronic devices in a vehicle according to another embodiment of the present disclosure.

FIG. 7 is a flowchart for explaining a method of seamlessly connecting multiple electronic devices in a vehicle according to another embodiment of the present disclosure.

More specifically, FIG. 7 illustrates a procedure in which the second Bluetooth device 630, connection of which has been released, is reconnected to the AVN terminal according to sound source play in a state in which streaming data is being received from the third Bluetooth device 640 according to the embodiment of FIG. 6.

Referring to FIG. 7, a sound source may be played in the second Bluetooth device 630 by the user in a state in which the AVN terminal 610 is receiving streaming data from the third Bluetooth device 640 (step S710).

Upon sensing a sound source play event (step S720), the second DBA 631 may transmit an AVN terminal connection request message to the second Bluetooth device 620 (step S730).

Upon receiving the AVN terminal connection request signal, the second Bluetooth device 630 may transmit a connection request message to the AVN terminal 610 (step S740).

According to the embodiment of FIG. 6, if the connection request message is additionally received from the second Bluetooth device 630 in a state in which two Bluetooth devices, i.e., the first Bluetooth device 620 and the third Bluetooth device 640, haven been physically connected, the AVN terminal 610 may search for a Bluetooth device, connection of which can be released, in a transparent manner to the user (step S750).

As a search result, if the third Bluetooth device 640 is determined to be a Bluetooth device, connection of which can be released, the AVN terminal 610 may transmit a streaming stop message and a connection release message to the third Bluetooth device 640 (step S760). If the connection release message is received by the third Bluetooth device 640, the third DBA 641 may be activated and operated.

Next, upon successfully acknowledging the second Bluetooth device 630, the AVN terminal 610 may transmit a connection acknowledgement response message to the second Bluetooth device 640 and set connection with the second Bluetooth device 630, and perform a control operation such that streaming data is received from the second Bluetooth device 630 (step S770). If the connection acknowledgement response message is received by the second Bluetooth device 630, the second DBA 631 may be deactivated.

The method and apparatus according to the present disclosure have the following effects.

First, a method and apparatus for seamlessly connecting multiple electronic devices in a vehicle can be provided.

Second, in the method and apparatus for seamlessly connecting multiple electronic devices in a vehicle, a plurality of Bluetooth devices can be seamlessly connected to a vehicle AVN terminal without additional user manipulation after initial Bluetooth device connection setting is performed once.

Third, in the method and apparatus for seamlessly connecting multiple electronic devices in a vehicle, three or more Bluetooth devices can be seamlessly connected.

Fourth, customer satisfaction can be improved by minimizing user inconvenience in performing a Bluetooth pairing procedure in a vehicle.

It will be appreciated by persons skilled in the art that the effects that can be achieved through the present disclosure are not limited to what has been particularly described hereinabove and other advantages of the present disclosure will be more clearly understood from the above detailed description.

It will be apparent to those skilled in the art that various modifications and variations can be made in the present disclosure without departing from the spirit or scope of the invention. Thus, it is intended that the present disclosure cover the modifications and variations of this invention provided they come within the scope of the appended claims and their equivalents.

What is claimed is:

1. A method of connecting multiple electronic devices to an audio video navigation (AVN) terminal mounted in a vehicle, the method comprising:
   receiving a connection request message from a third Bluetooth device in a state in which first and second Bluetooth devices have been connected to the AVN terminal;
   searching for a Bluetooth device, connection of which can be released; and
   releasing connection to any one of the first and second Bluetooth devices according to a search result and setting connection to the third Bluetooth device.

2. The method of claim 1, further comprising
   receiving streaming data from any one of the first and second Bluetooth devices.

3. The method of claim 2, further comprising
   transmitting a streaming stop message to a Bluetooth device which is transmitting the streaming data.

4. The method of claim 3, further comprising
   performing control to receive the streaming data from the third Bluetooth device after transmitting the streaming stop message.

5. The method of claim 4,
   wherein the streaming data includes sound source data, and
   wherein, when the AVN terminal receives the sound source data from the third Bluetooth device, the method further comprises performing control to output the sound source data through a speaker included in the vehicle.

6. The method of claim 5,
   wherein, when a sound source is played from the third Bluetooth device, a dispatch Bluetooth agent mounted in the third Bluetooth device senses the played sound source and transmits the connection request message to the AVN terminal.

7. A non-transitory computer-readable recording medium in which a program for executing the method of claim 1 is recorded.

8. A method of connecting multiple electronic devices to a Bluetooth device including a Bluetooth agent dispatched from an audio video navigation (AVN) terminal mounted in a vehicle, the method comprising:
   sensing, by the Bluetooth agent, whether a sound source is played in the Bluetooth device;
   upon sensing that the sound source is played, confirming, by the Bluetooth device, whether a device paired through Bluetooth to output sound is present;
   upon confirming that the device paired through Bluetooth is not present, confirming, by the Bluetooth device, whether history information regarding pairing between the Bluetooth device and the AVN terminal is present;
   upon confirming that the history information regarding pairing between the Bluetooth device and the AVN terminal is present, transmitting, by the Bluetooth device, a connection request message to the AVN terminal; and
   upon receiving a connection acknowledgment message from the AVN terminal, streaming, by the Bluetooth device, the played sound source and transmitting the streamed sound source to the AVN terminal.

9. The method of claim 8,
   wherein the history information regarding pairing between the Bluetooth device and the AVN terminal includes media access control (MAC) address information of a Bluetooth module included in the AVN terminal.

10. The method of claim 8, further comprising
    upon confirming that the device paired through Bluetooth to output sound is present, outputting the played sound source using the paired device, and upon confirming that the history information regarding pairing between the Bluetooth device and the AVN terminal is not present, performing control to output the played sound source through a speaker included in the Bluetooth device.

11. An apparatus for seamlessly connecting multiple electronic devices to an audio video navigation (AVN) terminal mounted in a vehicle, the apparatus comprising:
    a Bluetooth module configured to receive a connection request message from a third Bluetooth device in a state in which first and second Bluetooth devices have been connected to the AVN terminal; and
    a controller configured to search for a Bluetooth device, connection of which can be released, release connection to any one of the first and second Bluetooth devices according to a search result, and set connection of the AVN terminal to the third Bluetooth device.

12. The apparatus of claim 11,
    wherein, when the connection request message is received in a state in which streaming data is being received through the Bluetooth module from any one of the first and second Bluetooth devices, the controller generates a streaming stop message and transmits the streaming stop message to a Blue tooth device which is currently transmitting the streaming data.

13. The apparatus of claim 12,
    wherein the controller performs control to receive the streaming data from the third Bluetooth device after transmitting the streaming stop message.

14. The apparatus of claim 13,
    wherein the streaming data includes sound source data, and
    wherein, when the sound source data is received from the third Bluetooth device, the controller performs control to output the received sound source data through a speaker included in the vehicle.

15. The apparatus of claim 14,
    wherein, when a sound source is played from the third Bluetooth device, a dispatch Bluetooth agent mounted in the third Bluetooth device senses the sound source play and transmits the connection request message to the apparatus.

16. A Bluetooth device linkable to an audio video navigation (AVN) terminal mounted in a vehicle, the Bluetooth device comprising:
   a dispatch Bluetooth agent configured to sense a sound source play in the Bluetooth device, the dispatch Bluetooth agent being dispatched from the AVN terminal to the Bluetooth device, and generate a device connection confirmation request signal; and
   a user Bluetooth module configured to transmit a connection request message to the AVN terminal, when a device paired through Bluetooth to output sound is not present according to the device connection confirmation request signal and history information regarding pairing between the Bluetooth device and the AVN terminal is present, stream the played sound source when a connection acknowledgement message is received from the AVN terminal, and transmit the streamed sound source to the AVN terminal.

17. The Bluetooth device of claim 16,
   wherein the history information regarding pairing between the Bluetooth device and the AVN terminal includes media access control (MAC) address information of a Bluetooth module included in the AVN terminal.

18. The Bluetooth device of claim 17,
   wherein, when the device paired through Bluetooth to output sound is present, the played sound source is output using the device paired through Bluetooth, and
   when the history information regarding pairing between the Bluetooth device and the AVN terminal is not present or the connection acknowledgement message is not received, the played sound source is output through a speaker included in the Bluetooth device.

\* \* \* \* \*